US010411553B2

(12) United States Patent
Haga et al.

(10) Patent No.: US 10,411,553 B2
(45) Date of Patent: Sep. 10, 2019

(54) MOTOR INCLUDING BUS BAR ASSEMBLY

(71) Applicant: Nidec Corporation, Kyoto (JP)

(72) Inventors: Hidehiro Haga, Kyoto (JP); Ryusuke Sato, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 274 days.

(21) Appl. No.: 15/472,349

(22) Filed: Mar. 29, 2017

(65) Prior Publication Data

US 2017/0201152 A1   Jul. 13, 2017

Related U.S. Application Data

(63) Continuation of application No. PCT/JP2015/069677, filed on Jul. 8, 2015.

(30) Foreign Application Priority Data

Sep. 30, 2014 (JP) ................................ 2014-201413

(51) Int. Cl.
*H02K 5/22* (2006.01)
*H02K 5/04* (2006.01)
(Continued)

(52) U.S. Cl.
CPC ............. *H02K 5/225* (2013.01); *H02K 3/28* (2013.01); *H02K 3/50* (2013.01); *H02K 5/04* (2013.01);
(Continued)

(58) Field of Classification Search
CPC ............ H02K 5/225; H02K 5/04; H02K 5/10; H02K 5/1732; H02K 7/083; H02K 11/215; H02K 11/33; H02K 3/28; H02K 3/50
(Continued)

(56) References Cited

U.S. PATENT DOCUMENTS 6,931,957 B2   8/2005   Saito et al.
7,215,115 B2   5/2007   Saito et al.
(Continued)

FOREIGN PATENT DOCUMENTS

JP   07-75283 A      3/1995
JP   2004-248492 A   9/2004
(Continued)

OTHER PUBLICATIONS

Machine translation of JP-2010158094-A. (Year: 2010).*
(Continued)

*Primary Examiner* — Michael Andrews
(74) *Attorney, Agent, or Firm* — Keating & Bennett, LLP (57) ABSTRACT

A bus bar holder of a motor includes a main body portion, and a connector portion protruding from the main body portion toward a radially outer side and located at a rear side of an axial direction ahead of a housing. The bus bar holder is provided with a seal portion directly or indirectly contacting a cover along a circumferential direction of a center axis. The connector portion includes a connector connection portion that connects the main body portion of the bus bar holder to the connector main body portion. At least a portion of the surface of a front side of an axial direction of the connector connection portion is located at a front side ahead of the seal portion at a radially outer side of the seal portion.

13 Claims, 8 Drawing Sheets (51) Int. Cl.
  *H02K 3/28* (2006.01)
  *H02K 3/50* (2006.01)
  *H02K 5/10* (2006.01)
  *H02K 5/173* (2006.01)
  *H02K 11/215* (2016.01)
  *H02K 11/33* (2016.01)
  *H02K 7/08* (2006.01)

(52) U.S. Cl.
  CPC .............. *H02K 5/10* (2013.01); *H02K 5/1732* (2013.01); *H02K 11/215* (2016.01); *H02K 11/33* (2016.01); *H02K 7/083* (2013.01)

(58) Field of Classification Search
  USPC ................................................ 310/71; 130/71
  See application file for complete search history.

(56) References Cited

U.S. PATENT DOCUMENTS

| | | | |
|---|---|---|---|
| 7,427,860 B2 | 9/2008 | Saito et al. | |
| 7,588,444 B2 | 9/2009 | Kataoka et al. | |
| 7,990,001 B2 | 8/2011 | Hatano et al. | |
| 8,390,158 B2 | 3/2013 | Nakamura et al. | |
| 8,729,754 B2 | 5/2014 | Fujii et al. | |
| 8,963,388 B2 | 2/2015 | Miyachi et al. | |
| 9,045,156 B2 | 6/2015 | Omae et al. | |
| 9,509,196 B2 | 11/2016 | Yongzuo et al. | |
| 2010/0320880 A1* | 12/2010 | Kamogi | H02K 11/33 310/68 B |
| 2011/0006625 A1* | 1/2011 | Fujii | H02K 3/522 310/71 |
| 2015/0357886 A1 | 12/2015 | Ishizeki et al. | |

FOREIGN PATENT DOCUMENTS

| | | | | |
|---|---|---|---|---|
| JP | 2007-006592 A | 1/2007 | | |
| JP | 2007-185055 A | 7/2007 | | |
| JP | 2007-221976 A | 8/2007 | | |
| JP | 2007-221977 A | 8/2007 | | |
| JP | 2010-158094 A | 7/2010 | | |
| JP | 2010-161863 A | 7/2010 | | |
| JP | 2010158094 A | * 7/2010 | ............. H02K 11/00 |
| JP | 2010-172086 A | 8/2010 | | |
| JP | 4552254 B2 | 9/2010 | | |
| JP | 2013-153633 A | 8/2013 | | |
| JP | 2013-247761 A | 12/2013 | | |
| JP | 5386072 B2 | 1/2014 | | |

OTHER PUBLICATIONS

Official Communication issued in corresponding International Application PCT/JP2015/069676, dated Sep. 29, 2015.
Official Communication issued in corresponding International Application PCT/JP2015/076570, dated Dec. 8 2015.
Official Communication issued in corresponding International Application PCT/JP2015/069677, dated Oct. 6, 2015.
Official Communication issued in corresponding International Application PCT/JP2015/069678, dated Sep. 15, 2015.
Official Communication issued in corresponding International Application PCT/JP2015/076571, dated Dec. 15, 2015.
Official Communication issued in corresponding International Application PCT/JP2015/076569, dated Dec. 22, 2015.
Haga, H. et al.; "Motor"; U.S. Appl. No. 15/472,320, filed Mar. 29, 2017.
Haga, H. et al.; "Motor"; U.S. Appl. No. 15/472,321, filed Mar. 29, 2017.
Haga, H. et al.; "Motor"; U.S. Appl. No. 15/472,322, filed Mar. 29, 2017.
Haga, H. et al.; "Motor"; U.S. Appl. No. 15/472,323, filed Mar. 29, 2017.
Haga, H. et al.; "Motor"; U.S. Appl. No. 15/472,324, filed Mar. 29, 2017.

* cited by examiner

MOTOR INCLUDING BUS BAR ASSEMBLY

CROSS REFERENCE TO RELATED APPLICATIONS

This application claims the benefit of priority to Japanese Patent Application No. 2014-201413 filed on Sep. 30, 2014 and is a Continuation Application of PCT Application No. PCT/JP2015/069677 filed on Jul. 8, 2015. The entire contents of each application are hereby incorporated herein by reference.

BACKGROUND OF THE INVENTION

1. Field of the Invention

The present invention relates to a motor.

2. Description of the Related Art

A motor including a casing is well known in the art. An O-ring used as a seal member is disposed in the casing of the motor.

However, in the above-mentioned motor, a plug portion protrudes outward from the casing. If external force is applied to the plug portion, a molded material including the plug portion, and at least one of a holder base and a casing contacting the mold material through a seal member may be unavoidably deformed. As a result, sealability of the motor is deteriorated.

SUMMARY OF THE INVENTION

In accordance with one preferred embodiment of the present invention, a motor includes a rotor with a shaft which has its center on a center axis extending in one direction; a stator enclosing the rotor and rotating the rotor about the center axis; a first bearing which is disposed at a first side in the one direction of the stator and supports the shaft; a second bearing which is disposed at a second side opposite to the first side of the stator and supports the shaft; and a cylindrical housing holding the stator and the first bearing; a bus bar assembly holding the second bearing, and allowing an end of the first side to be located in the housing; a cover fixed to the housing so as to cover at least a portion of the second side of the bus bar assembly, wherein the bus bar assembly includes a bus bar electrically connected to the stator; and a bus bar holder holding the bus bar, wherein the bus bar holder includes a cylindrical main body portion including an opening at the second side; and a connector portion protruding from the main body portion toward a radially outer side of the center axis, and located at the second side ahead of the housing; the bus bar holder is provided with a seal portion directly or indirectly contacting the cover over a circumference of the center axis, wherein the connector portion includes a connector connection portion connected to the main body portion; and a connector main body portion disposed at a radially outer side ahead of the connector connection portion, wherein at least a portion of a surface of the second side of the connector connection portion is located at the first side ahead of the seal portion at the radially outer side ahead of the seal portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Motors according to preferred embodiments of the present invention will hereinafter be described with reference to the attached drawings. Further, the scope of the present invention is not limited to the following preferred embodiments, but may be arbitrarily changed within the technical spirit of the present invention. To easily understand each component in the following drawings, actual structures, and a scale of each structure, the number of structures, etc., may be different.

Figure 1:
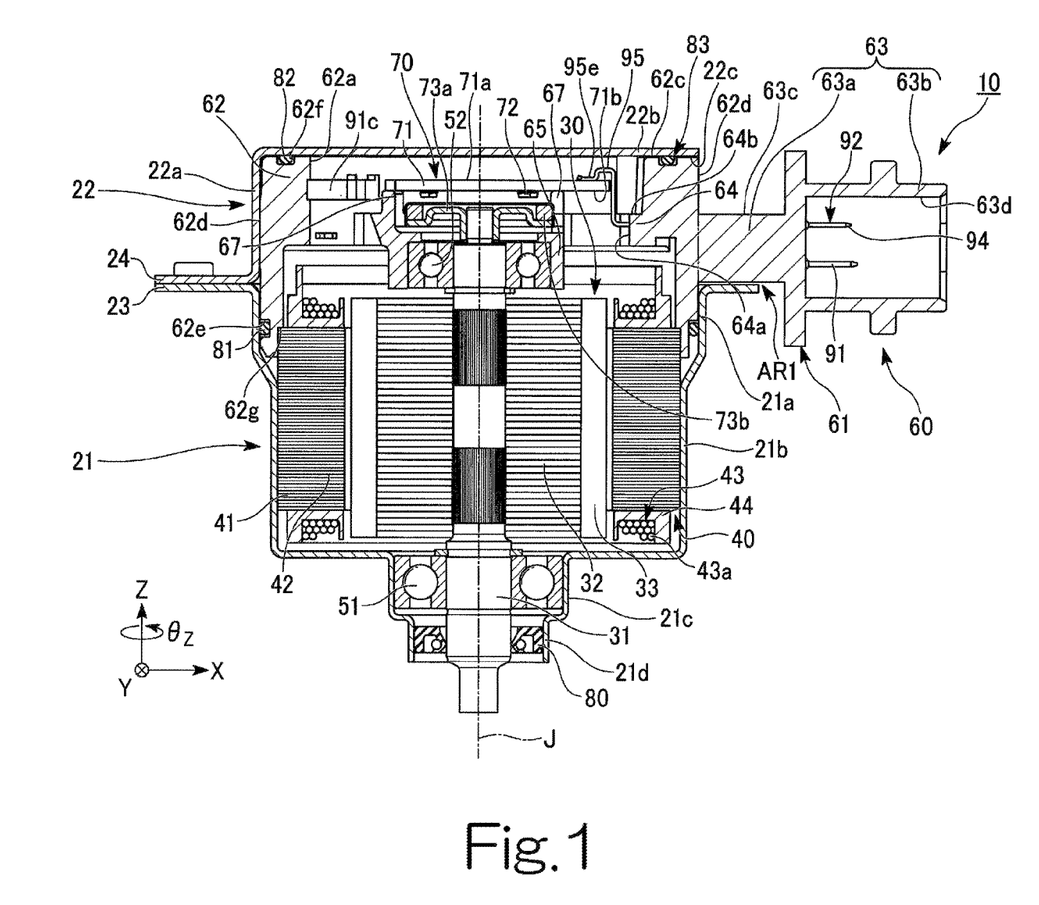
FIG. 1 is a cross-sectional view illustrating a motor according to a first preferred embodiment of the present invention.

In the drawings, an X-Y-Z coordinate system is provided as an appropriate three-dimensional (3D) orthogonal coordinate system. In the X-Y-Z coordinate system, a direction parallel to the axial direction (one direction) of a center axis J shown in FIG. 1 will hereinafter be referred to as a Z-axis direction. A direction parallel to a longitudinal direction of a bus bar assembly 60 shown in FIG. 1, that is, the left-and-right direction of FIG. 1, is referred to as an X-axis direction. A direction parallel to a width direction of the bus bar assembly 60, that is, a direction perpendicular to both the X-axis direction and the Z-axis direction, is referred to as a Y-axis direction.

In the following description, a positive side of the Z-axis direction (+Z side, a second side) will hereinafter be defined as 'rear side' and a negative side of the Z-axis direction (−Z side, a first side) will hereinafter be defined as 'front side.' It is to be understood that the descriptions of the rear side and the front side are used for explanation only, and they do not limit the actual location relation or direction. Also, unless otherwise explained, a direction parallel to the center axis J (Z-axis direction) is simply referred to as 'axial direction,' a radial direction having its center on the center axis J is simply referred to as 'radial direction,' and a circumferential direction having its center on the center axis J, that is, the axial circumference of center axis J (θZ direction), is simply referred to as 'circumferential direction.'

Further, herein, descriptions such as being axially extended do not only refer to a case of strictly being extended in the axial direction (Z-axis direction), but it may also include the other case of being extended in a direction inclined at less than 45° relative to the axial direction. Also, descriptions such as being radially extended do not only refer to a case of strictly being extended in the radial direction, that is, the direction perpendicular to the axial direction (Z-axis direction), but it may also include a case of being extended in a direction inclined at less than 45° relative to the radial direction.

Figure 2:
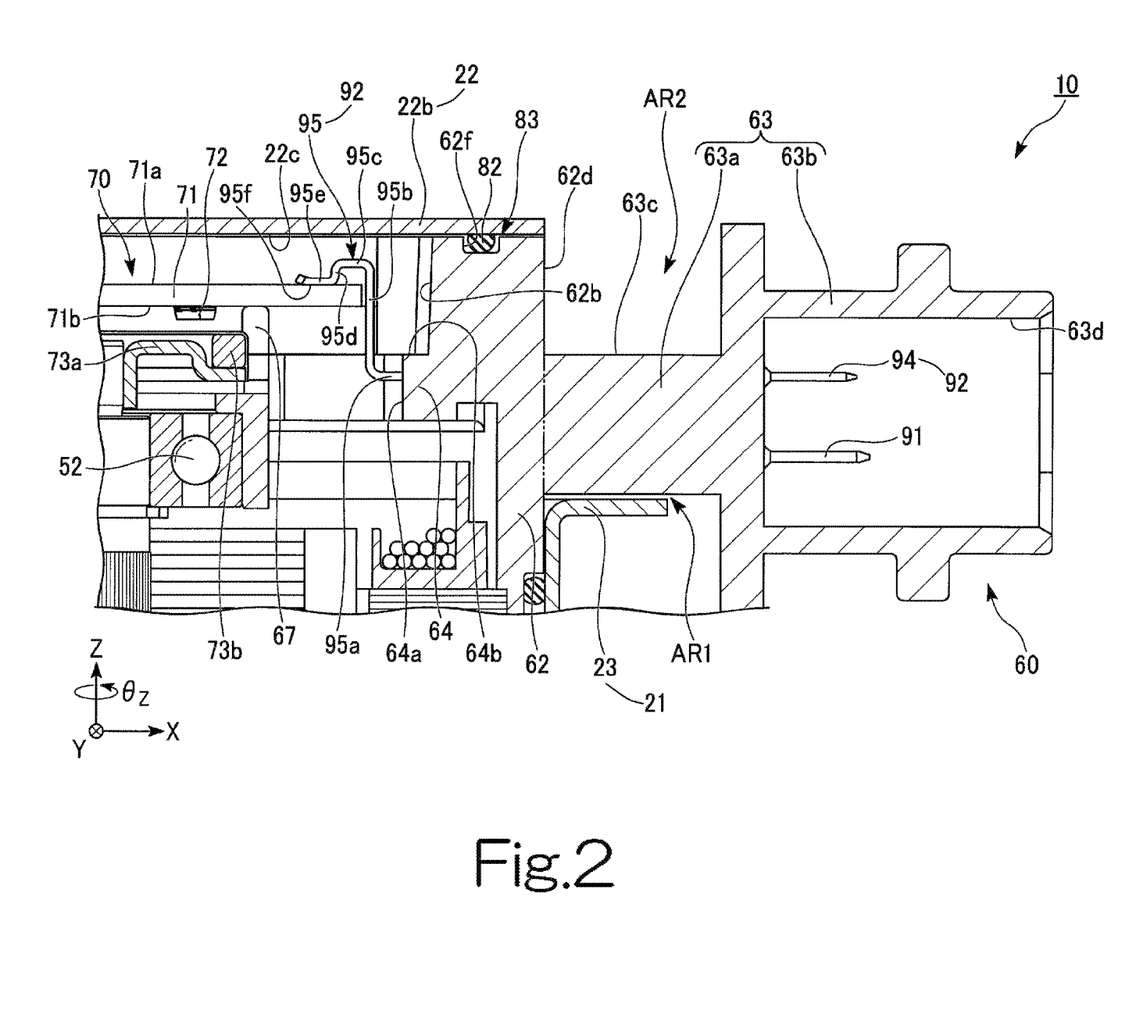
FIG. 2 is a view illustrating the motor according to a first preferred embodiment of the present invention, and is a partially enlarged view of FIG. 1.

FIG. 1 is a cross-sectional view illustrating a motor 10 according to a preferred embodiment of the present invention. FIG. 2 is a cross-sectional view illustrating a portion of the motor 10, and is a partially enlarged view of the motor shown in FIG. 1. The motor 10 according to the present preferred embodiment is a brushless motor. As illustrated in FIG. 1, the motor 10 preferably includes a housing 21, a cover 22, a rotor 30 having a shaft 31, a stator 40, a first bearing 51, a second bearing 52, a controller 70, a bus bar assembly 60, and a plurality of O-rings. The plurality of O-rings preferably includes a front side O-ring 81 and a rear side O-ring 82.

The rotor 30, the stator 40, the first bearing 51, and the oil seal 80 are accommodated into the housing 21. The housing 21 is opened toward the rear side (+Z side). An end of the front side (−Z side) of the bus bar assembly 60 is inserted into the opening of the housing 21. The bus bar assembly 60 holds the second bearing 52. The first bearing 51 and the second bearing 52 support both sides of the axial direction (Z-axis direction) of the shaft 31.

The cover 22 covers at least a portion of the rear side (+Z side) of the bus bar assembly 60. The cover 22 is fixed to the housing 21. The cover 22 preferably includes a cylindrical portion 22a, a cover portion 22b, a front surface 22c of the cover, and a rear side flange portion 24. The controller 70 is located between the second bearing 52 and the cover 22. The front side O-ring 81 is located between the bus bar assembly 60 and the housing 21. The rear side O-ring 81 is located between the bus bar assembly and the cover 22. The above-mentioned components will hereinafter be described in greater detail below.

The housing 21 is preferably a cylindrical or substantially cylindrical member, and holds the stator 40 and the first bearing 51. In a preferred embodiment of the present invention, the housing 21 preferably has a multi-stepped cylindrical shape or a substantially multi-stepped cylindrical shape with open ends on both sides. In this preferred embodiment, a material of the housing 21 is, for example, metal. In more detail, it is preferred that a material of the housing 21 is, for example, aluminum, iron alloy, or the like.

The housing 21 preferably includes a housing flange portion 23, a bus bar assembly insertion portion 21a, a stator holding portion 21b, a front bearing holding portion 21c, and an oil seal holding portion 21d. The housing flange portion 23, the bus bar assembly insertion portion 21a, the stator holding portion 21b, the front bearing holding portion 21c, and the oil seal holding portion 21d are disposed in a direction from the rear side (+Z side) to a front side (−Z side) along the axial direction (Z-axis direction). That is, in the housing 21, the front side flange portion 23 is preferably disposed at a rearmost side and the oil seal holding portion 21d is preferably disposed at a frontmost side. Each of the bus bar assembly insertion portion 21a, the stator holding portion 21b, the front bearing holding portion 21c, and the oil seal holding portion 21d preferably has a concentric cylindrical or substantially cylindrical shape. Diameters of the above members are reduced in the order of the bus bar assembly insertion portion 21a, the stator holding portion 21b, the front bearing holding portion 21c, and the oil seal holding portion 21d.

The housing flange portion 23 extends from the end of the rear side (+Z side) of the bus bar assembly insertion portion 21a toward a radially outer side. That is, the housing 21 includes a housing flange portion 23 at the end of the rear side. The bus bar assembly insertion portion 21a encloses an end of a front side (−Z side) of the bus bar assembly 60 from the radially outer side of the center axis J. In other words, at least a portion of the end of the front side (−Z side) of the bus bar assembly 60 is disposed in the bus bar assembly insertion portion 21a. That is, the end of the front side of the bus bar assembly 60 is disposed in the housing 21.

An outer surface of a stator 40 (preferably an outer surface of a core back portion 41, to be described later) is fitted into an inner surface of the stator holding portion 21b. Accordingly, the stator 40 is fixed to the housing 21. The front bearing holding portion 21c holds the first bearing 51. In this preferred embodiment, the inner surface of the front bearing holding portion 21c is fitted into the outer surface of the first bearing 51. The oil seal 80 is held in the oil seat holding portion 21d.

The rotor 30 preferably includes a shaft 31, a rotor core 32, and a rotor magnet 33. The shaft 31 has its center on the center axis J which extends in one direction (Z-axis direction). According to this exemplary preferred embodiment, the shaft 31 is a cylindrical or substantially cylindrical member. Further, the shaft 31 may be a solid member or a hollow cylindrical member. The shaft 31 is rotatably supported around the axis (in ±θZ direction) by the first bearing 51 and the second bearing 52. The end of the front side (−Z side) of the shaft 31 protrudes to the outside of the housing 21. In the oil seal holding portion 21d, the oil seal 80 is disposed around the axis of the shaft 31.

The rotor core 32 is preferably a cylindrical or substantially cylindrical member. The rotor core 32 is fixed to the shaft 31 while enclosing the shaft 31 around the axis (in the θZ direction). In more detail, the rotor core 32 preferably includes a through-hole which penetrates axially through the rotor core 32. At least a portion of the shaft 31 is disposed within the through-hole of the rotor core 32. The shaft 31 is fixed to the rotor core 32 by, for example, press-fitting, adhesion, or the like. In more detail, according to this exemplary preferred embodiment, the rotor magnet 33 preferably has an annular or substantially annular shape. The outer surface of the rotor core 32 faces the inner surface of the rotor magnet 33. The rotor magnet 33 is fixed to the rotor core 32 by, for example, an adhesive, or the like. Further, the shape of the rotor magnet 33 is not necessarily annular. The rotor magnet 33 may be defined by a plurality of magnets arranged on an outer circumferential surface of the rotor core 32 in a circumferential direction. The rotor magnet 33 is fixed to an outer surface along an axis circumference of the rotor core 32. The rotor core 32 and the rotor magnet 33 rotate integrally with the shaft 31.

The stator 40 preferably has a cylindrical or substantially cylindrical shape. The rotor 30 is located in the stator 40. In other words, the stator 40 encloses the rotor 30 around the axis (in the θZ direction). The stator 40 rotates the rotor 30 in the circumferential direction of the center axis J The stator 40 preferably includes a core back portion 41, a plurality of teeth portions 42, a plurality of coils 43, and a plurality of bobbins 44. According to this exemplary preferred embodiment, the core back portion 41 and the teeth portion 42 is a stacked steel plate in which a plurality of electromagnetic steel plates are stacked.

The core back portion 41 may have a cylindrical or substantially cylindrical shape. Preferably, the shape of the core back portion 41 is concentric with the shaft 31. The teeth portions 42 are disposed on an inner surface of the core back portion 41. Each teeth portion 42 extends from the inner surface of the core back portion 41 toward a radially inner side (that is, toward the shaft 31). Preferably, the teeth portions 42 are arranged at equal or substantially equal intervals in the inner surface of the core back portion 41 in the circumferential direction.

Preferably, the bobbin 44 is a cylindrical or substantially cylindrical member. Each bobbin 44 is respectively mounted on one of the teeth portions 42. Preferably, the bobbin is defined by at least two members engaged from an axial direction. Each coil 43 is disposed in each bobbin 44. Each coil 43 is provided by preferably winding a conductive wire 43a about a bobbin 44. Further, as the conductive wire 43a, a circular wire or a flat wire is preferably used.

The first bearing 51 is disposed at a front side (−Z side) of the stator 40. The first bearing 51 is held by the front bearing holding portion 21c. The second bearing 52 is disposed at the rear side (+Z side) opposite to the front side of the stator 40. The second bearing 52 is held by a rear bearing holding portion 65 of a bus bar holder 61 which will be described later.

The first bearing 51 and the second bearing 52 supports the shaft 31 of the rotor 30. According to this exemplary preferred embodiment, each of the first bearing 51 and the second bearing 52 is a ball bearing. However, the type of the first bearing 51 and the second bearing 52 is not particularly limited to the above bearing type. For example, different kinds of bearings such as a sleeve bearing and a fluid hydraulic bearing may also be used. Further, the type of bearing of the first bearing 51 may be different from that of the second bearing 52.

The oil seal 80 preferably is an annular or substantially annular member. The oil seal 80 is mounted in the oil seal holding portion 21d around the axis (in the θZ direction) of the shaft 31. In more detail, the oil seal 80 is disposed in the oil seal holding portion 21d. An end of an axial lower portion of the shaft 31 penetrates through the through-hole of the oil seal 80. The oil seal 80 is disposed between the oil seal holding portion 21d and the shaft 31. Therefore, the oil seal 80 may prevent water, oil, etc., from infiltrating from a gap between the oil seal holding portion 21d and the shaft 31 into the housing 20. The oil seal 80 is preferably made of, for example, a resin material. However, a configuration and a material of the oil seal 80 are not limited thereto, and therefore an oil seal of different kinds of configurations and materials may also be used.

The controller 70 controls driving operations of the motor 10. The controller 70 preferably includes the circuit board 71, a rotating sensor 72, a sensor magnet holding member 73a, and a sensor magnet 73b. That is, the motor 10 includes the circuit board 71, the rotation sensor 72, the sensor magnet holding member 73a, and the sensor magnet 73b.

The circuit board 71 is disposed on an extending line of the rear side (+Z side) of the shaft 31. The circuit board 71 is disposed between the second bearing 52 and the cover 22 in the axial direction (Z-axis direction). The circuit board 71 includes a circuit board rear surface 71a located at the rear side and a circuit board front surface 71b located at the front side (−Z side). The circuit board rear surface 71a and the circuit board front surface 71b are a main surface of the circuit board 71. That is, the circuit board front surface 71b and the circuit board rear surface 71a intersect with the center axis J (Z-axis). In this preferred embodiment, the main surface of the circuit board 71 is orthogonal to the axial direction. The circuit board rear surface 71a faces the cover front surface 22c.

The circuit board 71 is supported by the end of the rear side (+Z side) of a plurality of circuit board support portions 67 to be described later. At least one side of the main surface of the circuit board 71 is provided with a printed wiring (not shown). The circuit board 71 outputs, for example, a motor driving signal, etc.

The sensor magnet holding member 73a is an annular or substantially annular member. A hole at a center of the sensor magnet holding member 73a is fitted with a small diameter of the end of the rear side (+Z side) of the shaft 31. Accordingly, the position of the sensor magnet holding member 73a is determined on the basis of the shaft 31. Preferably, the sensor magnet holding member 73a is fixed to the shaft 31 by press-fitting, adhesion, etc. The sensor magnet holding member 73a may rotate along with the shaft 31.

The sensor magnet 73b preferably has an annular or substantially annular shape. An N pole and an S pole of the sensor magnet 73b are alternately disposed in the circumferential direction. The sensor magnet 73b is fitted on an outer circumferential surface of the sensor magnet holding member 73a. In more detail, at least a portion of the sensor magnet 73b comes in contact with the outer circumferential surface of the sensor magnet holding member 73a. Therefore, the sensor magnet 73b is fixed to the sensor magnet holding member 73a. As a result, the sensor magnet 73b is disposed at the circumference (±θZ direction) of the shaft 31 at the rear side (+Z side) of the second bearing 52 such that the sensor magnet 73b is able to rotate along with the shaft 31.

At least one rotation sensor 72 is preferably mounted on the front surface 71b of the circuit board. The rotation sensor faces the sensor magnet 73b in the axial direction (Z-axis direction). The rotation sensor 72 detects the position of the rotor depending on a change in magnetic flux of the sensor magnet 73b. Although not illustrated, according to the exemplary preferred embodiment, three rotation sensors 72 are disposed on, for example, the front surface 71b of the circuit board. Further, as the rotation sensor 72, for example, a hall device, etc., is used.

Figure 3:
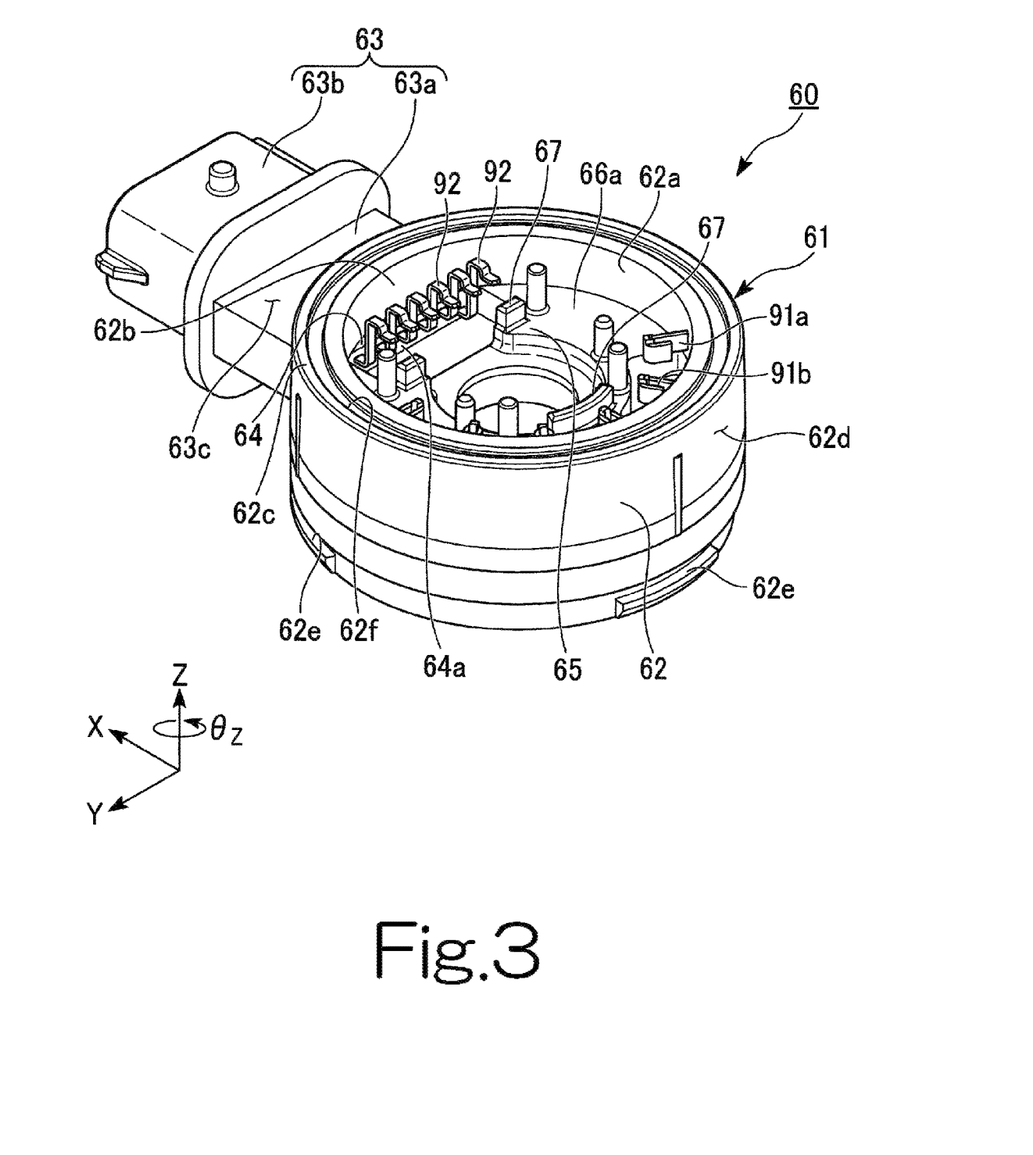
FIG. 3 is a perspective view illustrating a bus bar assembly according to a first preferred embodiment of the present invention.
Figure 4:
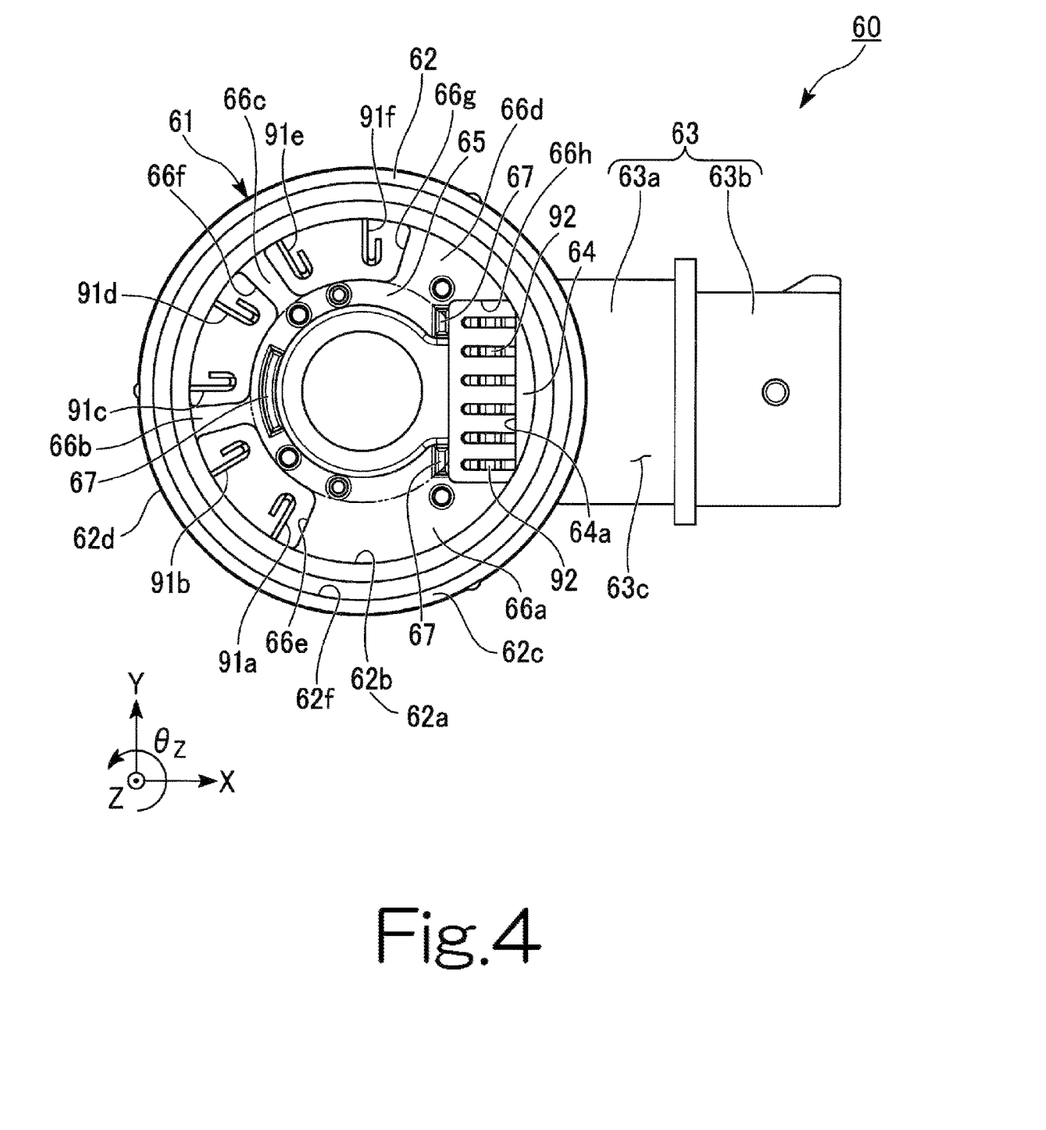
FIG. 4 is a plan view illustrating the bus bar assembly according to a first preferred embodiment of the present invention.

FIG. 3 is a perspective view illustrating the bus bar assembly 60. FIG. 4 is a plan view illustrating a bus bar assembly 60.

The bus bar assembly 60 supplies a driving current from an external power source to the stator 40. As illustrated in FIGS. 1 to 4, the bus bar assembly 60 preferably includes a bus bar holder 61, at least one bus bar 91, and a wiring member 92. In addition, in this preferred embodiment, the bus bar assembly 60 includes a plurality of the bus bars 91.

The bus bar holder 61 is preferably defined by a holder made of resin. Preferably, a material forming the bus bar holder is an electrically insulating resin. The bus bar holder 61 holds the bus bar 91 and the wiring member 92. As illustrated in FIG. 1, a rear side (+Z side) of the bus bar holder 61 is accommodated in the cylindrical portion 22a. In this preferred embodiment, the bus bar holder 61 is press-fitted into the cylindrical portion 22a. At least a portion of a front side (−Z side) of the bus bar holder 61 is accommodated in the bus bar assembly insertion portion 21a.

As long as a material forming the bus bar holder 61 has insulating properties, any material may be used without being specially limited. The bus bar holder 61 is preferably manufactured as a single monolithic member by, for example, injection molding. As illustrated in FIGS. 3 and 4, the bus bar holder 61 includes a main body portion 62, a connector portion 63, a connection terminal holding portion 64, a rear bearing holding portion 65, connection portions 66a, 66b, 66c, and 66d, and a plurality of circuit board support portions 67.

As illustrated in FIGS. 1 and 3, the main body portion 62 preferably has a cylindrical or substantially cylindrical shape enclosing the center axis J in the circumferential direction (θZ direction). The main body portion 62 includes an opening 62a at the rear side (+Z side) thereof. The main body portion 62 includes an inner surface 62b of a main body portion, a rear surface 62c of the main body portion located at the rear side, and an outer surface 62d of the main body portion. In the present preferred embodiment, the main body portion 62 preferably has a cylindrical or substantially cylindrical shape. The main body portion 62 encloses the end of the rear side of the rotor 30 and the end of the rear side of the stator 40 in the circumferential direction. That is, at least a portion of the rotor 30 and at least a portion of the rear side of the stator 40 is located in the front side (−Z side) of the main body portion 62.

A stepped portion 62g in which an inner diameter of the main body portion 62 increases from the rear side (+Z side) to the front side is provided to the inner surface of the end of the front side (−Z side) of the main body portion 62. A stepped surface orthogonal to the axial direction (Z-axis direction) of the stepped portion 62g contacts the end of the rear side (+Z side) of the core-back portion 41 (+Z side). Therefore, the bus bar holder 61 contacts the end of the rear side of the stator 40. The bus bar holder 61 contacts the stator 40 such that the axial position of the bus bar holder 61 is decided.

As illustrated in FIGS. 1 and 2, a seal portion 83 is disposed in the main body portion 62. That is, a seal portion 83 is preferably disposed at the bus bar holder 61. In the present preferred embodiment, the seal portion 83 is preferably disposed at a rear surface 62 of the main body portion.

The seal portion 83 seals the spacing between the cover 22 and the bus bar holder 61. In this preferred embodiment, in the seal portion 83, a groove portion 62f including the groove portion 62f is provided over a circumference along the external appearance of the main body portion 62 enclosing the opening 62a. As illustrated in FIG. 4, in this preferred embodiment, the groove portion 62f preferably has an annular or substantially annular shape in a plane view (XY plane view).

As illustrated in FIGS. 1 and 2, the rear side O-ring 82 is fitted into the groove portion 62f. That is, the rear side O-ring 82 is disposed in the seal portion 83. As a result, the seal portion 83 indirectly contacts the cover 22 through the rear side O-ring 82 in the circumferential direction of the center axis J.

As illustrated in FIG. 3, an O-ring holding portion 62e is disposed in the front side (−Z side) of the outer surface 62d of the main body portion 62. As illustrated in FIG. 1, the front side O-ring 81 is preferably fitted into the O-ring holding portion 62e.

The rear bearing holding portion 65 is disposed in the main body portion 62 along the radial direction. The rear bearing holding portion 65 holds the second bearing 52. As illustrated in FIG. 4, the connection portions 66a, 66b, 66c, and 66d connect the main body portion 62 to the rear bearing holding portion 65 disposed in the main body portion 62. The connection portions 66a-66d are positioned at the circumference of the rear bearing holding portion 65 while being spaced apart from each other at equal or substantially equal intervals along the circumferential direction.

Gaps 66e, 66f, 66g, and 66h are provided among the connection portions 66a-66d neighboring with each other in the circumferential direction. That is, gaps 66e, 66f, 66g, and 66h are provided between the rear bearing holding portion 65 and the main body portion 62. The gap 66e is defined by the connection portion 66a, the connection portion 66b, the main body portion 62, and the rear bearing holding portion 65. The gap 66f is formed by the connection portion 66b, the connection portion 66c, the main body portion 62, and the rear bearing holding portion 65. The gap 66g is defined by the connection portion 66c, the connection portion 66d, the main body portion 62, and the rear bearing holding portion 65. The gap 66h is defined by the connection portion 66d, the rear bearing holding portion 65, the connection portion 66a, the connection terminal holding portion 64, and the main body portion 62.

In a plane view, the position of the gap 66e is a position including coil connection portions 91a and 91b to be described later. In a plane view, the position of the gap 66f is a position including coil connection portions 91c and 91d to be described later. In a plane view, the position of the gap 66g is a position including coil connection portions 91e and 91f to be described later. In a plane view, the position of the gap 66h is a position including a circuit board connection terminal 95 to be described later. In a plane view, the gap 66h preferably has a rectangular or substantially rectangular shape.

As illustrated in FIGS. 3 and 4, the plurality of circuit board support portions 67 protrudes from the surface of the rear side (+Z side) of the rear bearing holding portion 65 toward the rear side. In the example of FIG. 4, three circuit board support portions 67 are disposed on the surface of the rear side of the rear bearing holding portion 65. The circuit board support portion 67 supports the circuit board 71 at the end of the rear side.

The connector portion 63 is a portion connected to the external power supply (not shown). As illustrated in FIGS. 1 and 2, the connector portion 63 extends from a portion of the main body outer surface 62d of the main body portion 62 toward the radially outer side (+X side) of the center axis J. That is, the connector portion 63 protrudes from the main body portion 62 toward the radially outer side of the center axis J. The connector portion 63 is located at the rear side (+Z side) ahead of the housing 21. The connector portion 63 preferably has a cylindrical or substantially cylindrical shape. The connector portion 63 preferably has a rectangular parallelepiped or substantially rectangular parallelepiped shape. The connector portion 63 includes an opening at the radially outer side (+X side). The entirety of the connector portion 63 is exposed to the outside of the cover 22.

The connector portion 63 preferably includes a connector connection portion 63a and a connector main body portion 63b. For example, the connector connection portion 63a preferably has a rectangular parallelepiped or substantially rectangular parallelepiped shape. The connector connection portion 63a is connected to the main body portion 62. The connector connection portion 63a is connected to the connector main body portion 63b. That is, the connector connection portion 63a preferably connects the main body portion 62 to the connector main body portion 63b.

The connector connection portion 63a includes a connector portion rear surface 63c located at the rear side (+Z side). The connector portion rear surface 63c is located at the radially outer side ahead of the seal portion 83, such that the connector portion rear surface 63c is located at the front side (−Z side) ahead of the seal portion 83. That is, the connector portion rear surface 63c is located at the front side ahead of the main body rear surface 62c. In the present preferred embodiment, the surface of the rear side of the connector connection portion 63a is defined by the connector portion rear surface 63c only. That is, in the present preferred embodiment, the entire surface of the rear side of the connector connection portion 63a is located at the front side ahead of the seal portion 83. In the present preferred embodiment, the entire surface of the rear side of the connector connection portion 63a is located at the radially outer side ahead of the seal portion 83.

Further, in the present preferred embodiment, the surface of the rear side (+Z side) of the connector connection portion includes all the surfaces of the connector connection portion when the connector connection portion is viewed to the front side (−Z side) from the rear side. In addition, the surface of the connector connection portion may be a flat surface or a curved surface.

The entirety of the connector portion rear surface 63c is exposed when viewed from the rear side (+Z side) to the front side (i.e., in the −Z direction). In other words, the cover 22 is not disposed at the rear side of the connector portion rear surface 63c. An air gap AR2 is defined at the rear side of the connector connection portion 63a. The air gap AR2 is located at the radially outer side of the main body portion 62. The air gap AR2 is disposed between the main body portion 62 and the connector main body portion 63b in the radial direction.

In the axial direction (i.e., Z-axis direction), a gap AR1 is defined between the connector connection portion 63a and the housing flange portion 23 of the housing 21. That is, in the axial direction, the gap AR1 is disposed between the connector portion 63 and the housing 21.

The connector main body portion 63b is located at the radially outer side of the connector connection portion 63a. The connector main body portion 63b includes a power-supply opening 63d. The power-supply opening 63d is opened to one side (+X side) of the longitudinal direction of the bus bar holder 61. The base bar 91 and the external power-supply connection terminal 94 to be described later are disposed at the bottom surface of the power-supply opening 63d.

As illustrated in FIGS. 2 to 4, the connection terminal holding portion 64 protrudes from the main body inner surface 62b toward the radially inner side. The connection terminal holding portion 64 is disposed at the main body inner surface 62b of a specific portion connected to the connector portion 63. The connection terminal holding portion 64 preferably includes the holding portion inner surface 64a located in the radial direction and the holding portion rear surface 64b located at the rear side (+Z side). As illustrated in FIG. 2, the holding portion rear surface 64b is located at the front side (−Z side) ahead of the main body rear surface 62c.

The bus bar 91 is a thin plate-shaped member made of an electrically conductive material (for example, metal, etc.). The bus bar 91 is directly or indirectly electrically connected to the stator 40. The driving current is supplied from an external power supply or the like to the stator 40 through the bus bar 91. Although not shown in the drawings, according to this preferred embodiment, the bus bars 91 are mounted to the stator 40. For example, if the motor is a three-phase motor, at least three bus bars 91 are mounted to the stator 40. In addition, according to a difference in coil wiring methods, the number of bus bars 91 may be changed to, for example, 4 or higher. Each bus bar 91 is disposed in the bus bar holder 61. As illustrated in FIG. 1, one end of the bus bar 91 protrudes from the bottom surface of the power-supply opening 63d, and is exposed outside the cover 22. Preferably, the external power supply is connected to one end of the bus bar 91 exposed outside the cover.

As illustrated in FIG. 4, the plurality of bus bars 91 preferably include coil connection portions 91a, 91b, 91c, 91d, 91e, and 91f. The coil connection portions 91a-91f are disposed at the other end of the plurality of bus bars 91. The coil connection portions 91a-91f protrude from the inner surface 62b of the main body portion. In the circumferential direction, the positions of the coil connection portions 91a-91f are preferably different from that of the connection terminal holding portion 64.

As illustrated in FIG. 1, the end of the rear side (+Z side) of the coil connection portion 91c is located at the rear side ahead of the circuit board front surface 71b. At least a portion of the coil connection portion 91c overlaps with the circuit board 71 in the radial direction. The coil connection portion 91c is electrically connected to the coil 43 through a connection member (not shown). Accordingly, the bus bar 91 is electrically connected to the stator 40. In the above-mentioned description, the coil connection portions 91a, 91b, and 91d-91f are preferably identical in structure to the coil connection portion 91c, and as such a detailed description thereof will herein be omitted.

As illustrated in FIG. 2, the wiring member 92 is fixed to the bus bar holder 61. A portion of the wiring member 92 is embedded in the bus bar holder 61. The wiring member 92 electrically connects the external power supply (not shown) to the circuit board 71. The wiring member 92 includes the external power-supply connection terminal 94 and the circuit board connection terminal 95. The external power-supply connection terminal 94 and the circuit board connection terminal 95 is exposed from the bus bar holder 61.

The external power-supply connection terminal 94 is disposed in the connector portion 63. The external power-supply connection terminal 94 protrudes from the bottom surface of the power-supply opening 63d. The external power-supply connection terminal 94 is electrically connected to the external power supply (not shown).

The circuit board connection terminal 95 protrudes from the holding portion inner surface 64a. The circuit board connection terminal 95 preferably includes a first terminal portion 95a, a second terminal portion 95b, a third terminal portion 95c, a fourth terminal portion 95d, and a plate-shaped portion 95e.

The first terminal portion 95a protrudes toward the radially inner side from the holding portion inner surface 64a. The first terminal portion 95a is located at the outside of the radial direction ahead of the circuit board 71. The second terminal portion 95b extends from the end of the inner side of the radial direction of the first terminal portion 95a toward the rear side (+Z side). The second terminal portion 95b extends to a further rear side ahead of the circuit board rear surface 71a.

The third terminal portion 95c extends from the end of the rear side (+Z side) of the second terminal portion 95b toward the radially inner side. The fourth terminal portion 95d extends from the third terminal portion 95c to the front side (−Z side).

The plate-shaped portion 95e extends from the end of the front side (−Z side) of the fourth terminal portion 95d toward the radially inner side. The plate-shaped portion 95e is disposed at the end of the radially inner side of the circuit board connection terminal 95. The plate-shaped portion 95e preferably includes a connection surface 95f. The connection surface 95f is parallel to the circuit board rear surface 71a. The connection surface 95f contacts the circuit board rear surface 71a. Although not shown in the drawings, the plate-shaped portion 95e is preferably fixed to the circuit board 71 by, for example, soldering. Therefore, the circuit board connection terminal 95 is electrically connected to the circuit board 71. In other words, the wiring member 92 is electrically connected to the circuit board 71.

In this preferred embodiment, as illustrated in FIG. 4, in the circumferential direction (θZ direction) of the center axis J, the position of the circuit board connection terminal 95 is different from those of the coil connection portions 91a-91f of the bus bar 91.

As illustrated in FIG. 1, the front side O-ring 81 is preferably disposed in the housing 21. The front side O-ring 81 is fixed to the O-ring holding portion 62e. The front side O-ring 81 comes in contact with the inner surface of the housing 21 and the outer surface of the main body portion 62 over its circumference. That is, the front side O-ring 81 preferably contacts the main body portion 62 and the housing 21 over its circumference. Stress generated from the inner surface of the bus bar assembly insertion portion 21a is loaded on the front side O-ring 81.

The rear side O-ring 82 is disposed in the cover 22. As described above, the rear side O-ring 82 is located at the seal portion 83 disposed in the main body portion 62. The rear side O-ring 82 is fitted into the groove portion 62f. The entire circumference of the rear side O-ring 82 preferably contacts the cover front surface 22c to be described later. Stress generated from the cover front surface 22c is loaded on the rear side O-ring 82.

A configuration of the front side O-ring 81 and the rear side O-ring 82 is not limited thereto, and other O-rings may also be used. In this preferred embodiment, the front side O-ring 81 and the rear side O-ring 82 may preferably be made of, for example, resin material including silicon rubber or the like. If the O-rings 81 and 82 are made of silicon rubber, the front side O-ring 81 and the rear side O-ring 82 are preferably manufactured by, for example, machining elongated silicon rubber having a round cross section in a ring shape.

The cover 22 is attached to the rear side (+Z side) of the housing 21. The cover 22 is preferably made of, for example, metal. Specifically, the cover 22 is made of, for example, aluminum (Al) or an iron alloy such as SUS. As described above, the cover 22 preferably includes a cylindrical portion 22a, a cover portion 22b, and a cover flange portion 24.

The cylindrical portion 22a is opened toward the front side (−Z side). The cylindrical portion 22a encloses the bus bar assembly 60 from the radially outer side of the center axis J. In more detail, the cylindrical portion 22a encloses the end of the rear side (+Z side) of the main body portion 62 from the radially outer side of the center axis J. In other words, at least a portion of the end of the rear side (+Z side) of the main body portion 62 is disposed in the cylindrical portion 22a. The cylindrical portion 22a is connected to the end of the rear side (+Z side) of the bus bar assembly insertion portion 21a through the housing flange portion 23 and the cover flange portion 24.

The cover portion 22b is connected to the end of the rear side (+Z side) of the cylindrical portion 22a. In the present preferred embodiment, the cover portion 22b preferably has a plate shape. For example, the plane view (XY plane view) of the cover portion 22b shows a circular or substantially circular shape. The cover portion 22b covers the entirety of the rear side (+Z side) of the main body portion 62. The cover portion 22b closes the opening 62a.

The cover portion 22b may be located in the radially inner side ahead of the connector connection portion 63a. That is, the cover portion 22b does not overlap with the connector connection portion 63a in the plane view (XY plane view).

The cover front surface 22c is located at the front side (−Z side) of the cover portion 22b. The cover front surface 22c preferably contacts the entire circumference of the rear side O-ring 82. Therefore, the cover 22 indirectly contacts the seal portion 83 located at the main body rear surface 62c through the rear side O-ring 82 over a circumference of the opening 62a.

The cover flange portion 24 extends from the end of the front side (−Z side) of the cylindrical portion 22a toward the radially outer side. That is, the cover 22 has a cover flange portion 24 at the end of the front side. The cover flange portion 24 overlaps with the housing flange portion 23. The cover flange portion 24 is preferably fixed to the housing flange portion 23 by, for example, welding, caulking, adhesion, screwing, etc. As a result, the housing 21 is welded to the cover 22.

For example, the external power supply is connected to the motor 10 through the connector portion 63. The connected external power is electrically connected to the bus bar 91 and the wiring member 92. The bus bar 91 protrudes from the bottom surface of the power-supply opening 63d. Therefore, the driving current is supplied from the external power supply to the coil 43 and the rotation sensor 72 through the bus bar 91 and the wiring member 92. The rotation sensor 72 detects the magnetic flux of the rotor magnet. The driving current supplied to the coil 43 is controlled depending on the rotating position of the rotor 30 calculated based on, for example, the detected magnetic flux of the rotor magnet. When the driving current is supplied to the coil 43, a magnetic field is generated in the coil 43. In other words, when the driving current is supplied to the coil 43, a torque is generated between the rotor 30 and the stator 40. With this torque, the rotor 30 and the shaft 31 rotates. By doing so, the motor 10 generates a rotational driving force.

In the present preferred embodiment, the connector portion rear surface 63c preferably is located at the front side ahead of the seal portion 83. Therefore, for example, when external force is applied to the connector portion 63, this external force is not easily transferred from the connector connection portion 63a to the seal portion 83. Therefore, deformation of the seal portion 83 is able to be significantly reduced or prevented, and reduction of sealability between the cover 22 and the bus bar holder 61 is able to be significantly reduced or prevented. Therefore, according to the motor of the present preferred embodiment, reduction of sealability is able to be significantly reduced or prevented.

In addition, according to the present preferred embodiment, the seal portion 83 preferably is disposed in the main body portion 62. When viewed from the rear side to the front side, the entirety of the rear surface 63c of the connector portion is exposed. That is, the cover portion 22b is not mounted to the rear side of the connector connection portion 63a. Therefore, when external force is applied to the connector portion 63 and the connector connection portion 63a is deformed, deformation of the connector connection portion 63a and the cover portion 22b is able to be significantly reduced or prevented. Therefore, according to the present preferred embodiment, a decrease of sealability between the cover 22 and the bus bar holder 61 is able to be significantly reduced or prevented.

In addition, according to the present preferred embodiment, the seal portion 83 preferably is disposed at the main body rear surface 62c. Therefore, for example, as in the present preferred embodiment, when the bus bar holder 61 is inserted into the cover 22, the rear side O-ring 82 mounted to the seal portion is able to be prevented from being damaged. Therefore, according to the present preferred embodiment, reduction of sealability caused by the seal portion 83 is able to be significantly reduced or prevented.

In addition, according to the present preferred embodiment, the entirety of the connector portion rear surface 63c is located at the front side ahead of the seal portion 83 of the rear side of the connector connection portion 63a. That is, according to the present preferred embodiment, the entirety of the connector portion rear surface 63c is preferably located at the front side ahead of the seal portion 83. Therefore, transferring external force applied to the connector portion 63 to the seal portion 83 is able to be further reduced or prevented. Accordingly, according to the present preferred embodiment, deformation of the seal portion 83 is able to be significantly reduced or prevented.

In addition, according to the present preferred embodiment, the bus bar holder 61 contacts the end of the rear side of the stator 40 such that the position of the bus bar holder 61 is decided. Assuming that the axial position of the bus bar holder 61 is decided by the stator 40, if the connector portion 63 contacts the housing 21 before the bus bar holder 61 contacts the stator 40, the position of the bus bar holder 61 is not decided by the stator 40. As a result, in the present preferred embodiment, the gap AR1 is disposed between the connector portion 63 and the housing 21. Therefore, contact between the connector portion 63 and the housing 21 may be prevented.

If the gap AR1 is disposed between the connector portion 63 and the housing 21, the connector portion 63 does not contact the housing 21. Therefore, the connector portion 63 is not supported by the housing 21 from the front side. Therefore, for example, when external force from the rear side is applied to the connector portion 63, the connector portion 63 is curved toward the front side such that the connector portion 63 is easily deformed. In more detail, the connector connection portion 63a is curved toward the front side such that the connector connection portion 63a is easily deformed.

In contrast, according to the present preferred embodiment, although the connector portion 63 is deformed as described above, reduction of sealability caused by the seal portion 83 is able to be significantly reduced or prevented. That is, the effect of decreasing or preventing reduction of sealability according to the preferred embodiment is strengthened when a structure in which the connector portion 63 is easily deformed (that is, a structure in which the gap AR1 is disposed between the connector portion 63 and the housing 21) is used.

In addition, the cover 22 preferably includes a cover flange 24. The housing 21 preferably includes a housing flange portion 23. The cover flange portion 24 is fixed to the housing flange portion 23. Therefore, the cover 22 is strongly fixed to the housing 21, resulting in increased sealability of the motor 10.

Due to arrangement of the circuit board 71, electronic components such as the rotation sensor 72 are able to be correctly and accurately arranged.

The end of the rear side of the coil connection portions 91a-91f is located at the rear side ahead of the circuit board front surface 71b. Therefore, the end of the rear side of the coil connection portions 91a-91f is located at the rear side ahead of the circuit board support portion 67 supporting the circuit board 71. Therefore, the coil connection portions 91a-91f are easily connected to the coil 43 of the stator 40 from the opening 62a.

At least a portion of the coil connection portions 91a-91f overlaps with the circuit board 71 in the radial direction. Therefore, a numerical value of the axial direction of the motor 10 is able to be reduced.

In the circumferential direction of the center axis J, the position of the circuit board connection terminal 95 is preferably different in position from the coil connection portions 91a-91f. Therefore, when the circuit board connection terminal 95 is connected to the circuit board 71, and when the coil connection portions 91a-91f are connected to the coil 43, mutual interference between the circuit board connection terminal 95 and the coil connection portions 91a-91f is significantly reduced or prevented. As a result, each connection is easily provided.

The circuit board connection terminal 95 preferably includes a plate-shaped portion 95e. The plate-shaped portion 95e includes a connection surface 95f. The connection surface 95f contacts the circuit board rear surface 71a. Therefore, according to the present preferred embodiment, a contact region between the circuit board connection terminal 95 and the circuit board 71 is able to be enlarged, such that the circuit board connection terminal 95 is able to be stably fixed to the circuit board 71.

The rear side O-ring 82 is disposed in the seal portion 83. Therefore, sealability between the cover 22 and the bus bar holder 61 is able to be increased. Further, the following structural elements can be used in the present preferred embodiment.

In the above description, the rear side O-ring 82 is preferably used as a seal member mounted to the seal portion 83. However, the scope of the seal member 83 is not limited to the above-mentioned member in preferred embodiments of the present invention. In the opening 62a, for example, a liquid gasket or the like may be used as the seal member disposed in the seal portion 83. The scope of a member that seals a gap between the housing 21 and the bus bar holder 61 is not limited to the above-mentioned member, and a liquid gasket and the like may also be applied to the seal member.

If the liquid gasket is used as the seal member mounted to the seal portion 83, the seal portion 83 directly contacts the cover front surface 22c. That is, according to the present preferred embodiment, the seal portion 83 may directly or indirectly contact the cover 22 along the circumferential direction of the center axis J.

In addition, in the seal portion 83, if a space between the cover 22 and the bus bar holder 61 is sealed, the seal member may not be disposed in the seal portion 83. For example, the seal portion 83 is pressed down by the cover front surface 22c, thus the spacing between the cover 22 and the bus bar holder 61 may be sealed.

The cover portion 22b may be located at the rear side of the connector connection portion 63a. The gap AR1 may not be constructed. The cover 22 may not include the cover flange portion 24. The housing 21 may not include the housing flange portion 23.

In addition, in the above-mentioned description, the circuit board 71 is disposed at the rear side of the shaft 31. However, the position of the circuit board is not limited to the above-mentioned position. For example, a through-hole may be defined in the circuit board 71, and the shaft 31 may be inserted into the through-hole. Preferably, the end of the rear side of the shaft 31 protrudes toward the rear side of the circuit board 71. In the present preferred embodiment, the circuit board 71 may not always be in the motor.

Figure 5:
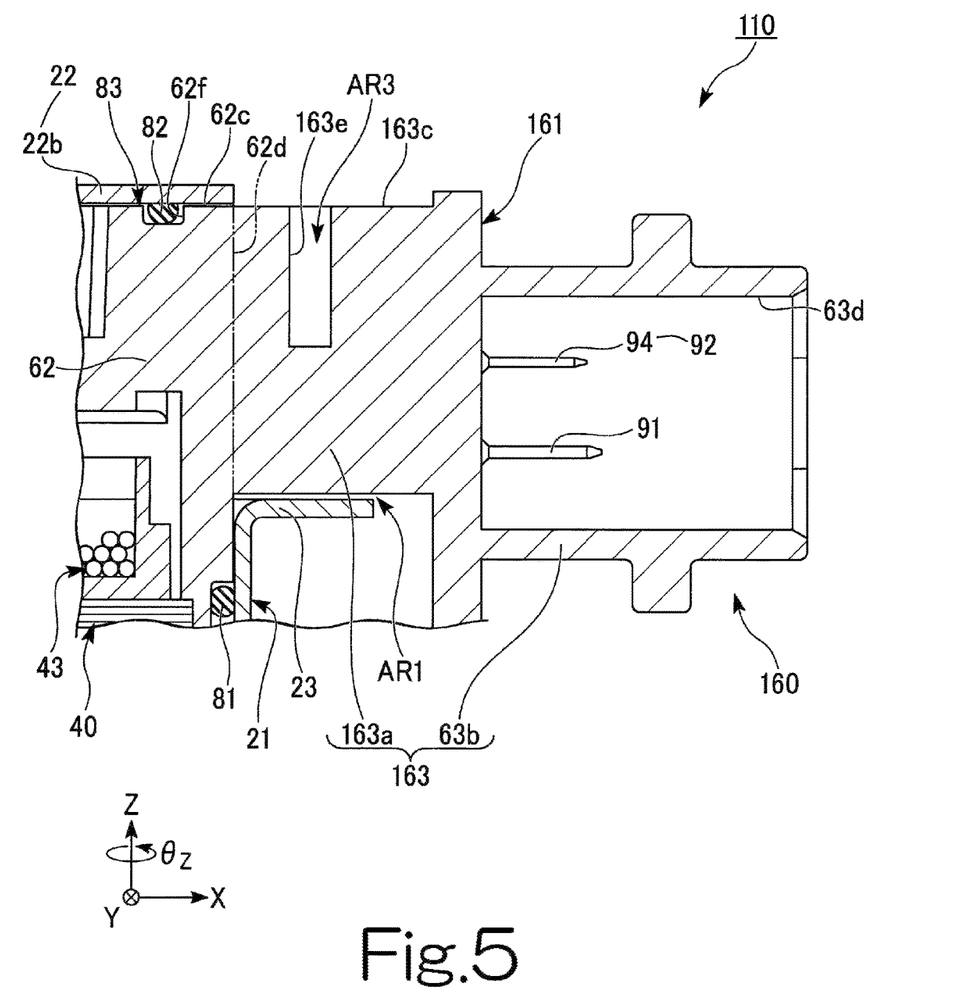
FIG. 5 is a partially cross-sectional view illustrating another example of the motor according to a first preferred embodiment of the present invention.
Figure 6:
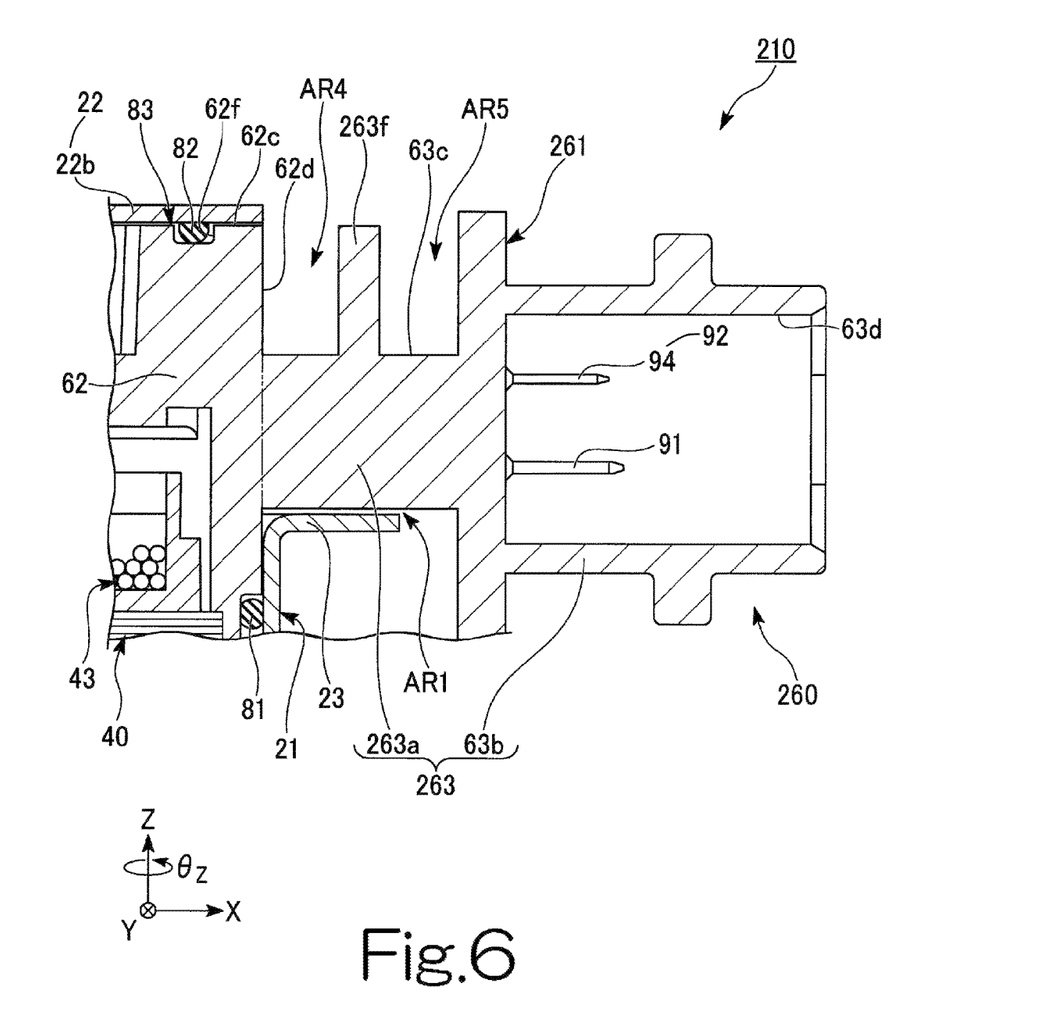
FIG. 6 is a partially cross-sectional view illustrating another example of the motor according to a first preferred embodiment of the present invention.
Figure 7:
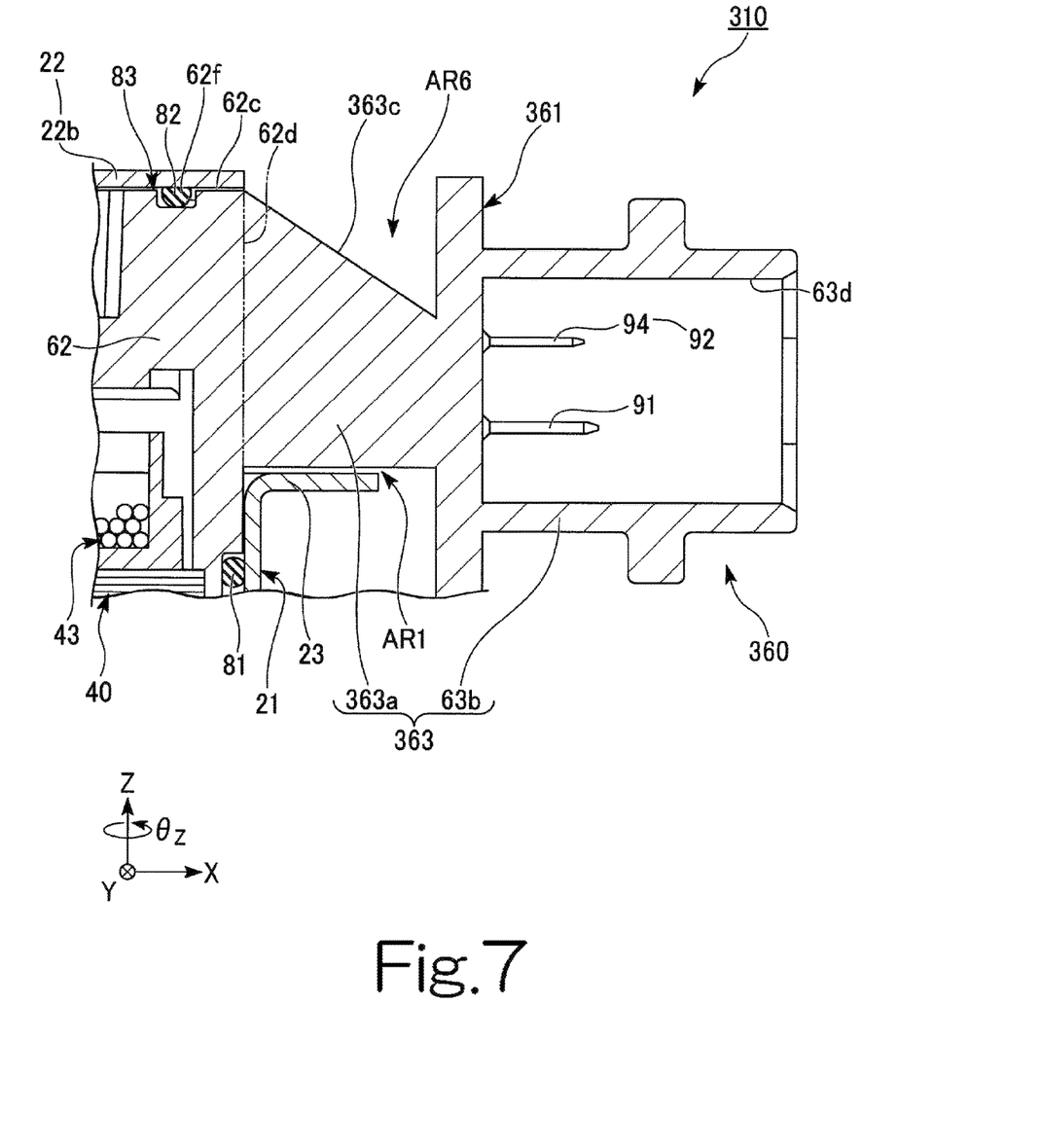
FIG. 7 is a partially cross-sectional view illustrating another example of the motor according to a first preferred embodiment of the present invention.

As illustrated in FIGS. 5 to 7, at least a portion of the surface of the rear side of the connector connection portion may also be located at the front side ahead of the seal portion within the radially outer side of the seal portion. A detailed description thereof will hereinafter be given.

FIG. 5 is a cross-sectional view illustrating another example of the motor 110 according to a first preferred embodiment of the present invention. In the following description, the same components or elements as those of the above-mentioned preferred embodiments are denoted with the same reference numbers and therefore the description of thereof may be omitted.

As illustrated in FIG. 5, the motor 110 includes a bus bar assembly 160. The bus bar assembly 160 includes a bus bar holder 161. The bus bar holder 161 preferably includes a main body portion 62 and a connector portion 163. The connector portion 163 includes a connector connection portion 163a and a connector main body portion 63b.

The connector connection portion 163a includes a connector portion rear surface 163c located at the rear side (+Z side). In the axial direction (Z-axis direction), the position of the connector portion rear surface 163c is preferably identical to that of the main body rear surface 62c. That is, in the axial direction, the position of the connector portion rear surface 163c is identical or substantially identical to that of the seal portion 83. A concave portion 163e which is concaved toward the front side (−Z side) is located at the connector portion rear surface 163c. That is, the concave portion 163e which is concaved toward the front side is preferably located at the surface of the rear side of the connector connection portion 163a.

The bottom surface of the concave portion 163e is located at the front side (−Z side) ahead of the seal portion 83. As illustrated in FIG. 5, the concave portion 163e is located at a portion of the width direction (Y-axis direction) of the connector connection portion 163a. The concave portion 163e may also be provided over the entirety of the width direction of the connector connection portion 163a.

Assuming that the bottom surface of the concave portion 163e is located at the front side (−Z side) ahead of the seal portion 83, the depth (i.e., a numerical value of the axial direction (Z-axis direction)) of the concave portion 163e is not especially limited. In addition, the concave portion 163e may also be located at any position of the connector portion rear surface 163c in the radial direction.

Since the concave portion 163e is provided, an air gap AR3 is defined in the connector connection portion 163a. That is, the air gap AR3 is an inner space of the concave portion 163e. In the radial direction, the air gap AR2 may be disposed between the main body portion 62 and the connector main body portion 63b.

The surface of the rear side (+Z side) of the connector connection portion 163a is defined by the connector portion rear surface 163c and the bottom surface of the concave portion 163e. As described above, the bottom surface of the concave portion 163e is located at the front side (−Z side) ahead of the seal portion 83. That is, a portion of the surface of the rear side of the connector connection portion 163a is located at the front side ahead of the seal portion 83. Other elements of the motor 110 are preferably identical to those of the motor 10 shown in FIGS. 1 to 4, and as such a detailed description thereof will herein be omitted.

The concave portion 163e is preferably disposed at the rear surface 163c of the connection portion. The bottom surface of the concave portion 163e is located at the front side ahead of the seal portion 83. Therefore, external force applied to the connector portion 63 is not easily transferred to the seal portion 83. According to this structure, the seal portion 83 is not easily deformed, such that reduction of sealability between the cover 22 and the bus bar holder 161 is significantly reduced or prevented.

A portion of the surface of the rear side of the connector connection portion 163a is located at the front side ahead of the seal portion 83. That is, the bottom surface of the concave portion 163e is located at the front side ahead of the seal portion 83. Therefore, excepting the arrangement region of the concave portion 163e, the numerical value of the axial direction in the connector connection portion 163e may be increased. Therefore, according to the above-mentioned structure, the bending strength of the connector connection portion 163a is able to be improved. As a result, when external force is applied to the connector portion 63, deformation of the connector connection portion 163a is significantly reduced or prevented.

In addition, one concave portion 163e may be used or a plurality of (two or more) concave portions 163e may be used. In addition, the connector portion rear surface 163c may be located at the front side ahead of the seal portion 83, and may also be located at the rear side. That is, assuming that a portion of the surface of the rear side of the connector connection portion 163a are located at the front side ahead of the seal portion 83, the remaining portion other than the surface of the rear side of the connector connection portion 163a may also be located at any position of the axial direction.

The cover portion 22b may also be located at the rear side of the connector connection portion 163a. In this case, the seal portion 83 may also be located at the rear surface 163c of the connector portion. If the seal portion 83 is disposed at the rear surface 163c of the connector portion, the concave portion 163e may be located at the radially outer side ahead of the seal portion 83 at the connector portion rear surface 163c.

FIG. 6 is a cross-sectional view illustrating another example of the motor 210 according to a preferred embodiment of the present invention. Further, in the following description, the same components as those of the above-mentioned preferred embodiments are denoted with the same reference numbers and therefore the description of thereof may be omitted.

As illustrated in FIG. 6, the motor 210 includes a bus bar assembly 260. The bus bar assembly 260 includes a bus bar holder 261. The bus bar holder 261 preferably includes a main body portion 62 and a connector portion 263. The connector portion 263 includes the connector connection portion 263a and the connector main body portion 63b. The connector connection portion 263a is identical in structure to the connector connection portion 63a shown in FIGS. 1 to 4, except for the presence of the rib 263f, such that a detailed description thereof will herein be omitted.

The rib 263f protrudes from the rear surface 63c of the connector portion toward the rear side (+Z side). For example, the rib 263f preferably extends to the entirety of the width direction (Y-axis direction) of the connector connection portion 263a. In the axial direction (Z-axis direction), the position of a cross section of the rear side of the rib 263f is identical or substantially identical to that of the main body rear surface 62c. That is, in the axial direction, the position of a cross section of the rear side of the rib 263f is identical or substantially identical to that of the seal portion 83.

Due to arrangement of the rib 263f, the air gap AR4 and the air gap AR5 are defined at the rear side (+Z side) of the connector portion rear surface 63c. The air gap AR4 and air gap AR5 are blocked by the rib 263f. The air gap AR4 and the air gap AR5 are disposed between the main body portion 62 and the connector main body portion 63b in the radial direction.

The surface of the rear side (+Z side) of the connector connection portion 263a is defined by the connector portion rear surface 63c and the cross section of the rear side of the rib 263f. As described above, the connector portion rear surface 63c is located at the front side (−Z side) ahead of the seal portion 83. That is, a portion of the surface of the rear side of the connector connection portion 263a is located at the front side ahead of the seal portion 83. The remaining elements other than the above-mentioned elements of the motor 210 are identical to those of the motor 10 shown in FIGS. 1 to 4, and as such a detailed description thereof will herein be omitted.

According to the above-described structure, the bending strength of the connector connection portion 263a may be increased by the rib 263f. Therefore, deformation of the connector connection portion 263a is able to be significantly reduced or prevented.

FIG. 7 is a cross-sectional view illustrating an example of the motor 310 according to another preferred embodiment of the present invention. Further, in the following description, the same components as those of the above-mentioned preferred embodiments are denoted with the same reference numbers and therefore the description of thereof may be omitted.

As illustrated in FIG. 7, the motor 310 includes a bus bar assembly 360. The bus bar assembly 360 includes a bus bar holder 361. The bus bar holder 361 preferably includes the main body portion 62 and the connector portion 363. The connector portion 363 includes a connector connection portion 363a and a connector main body portion 63b.

The connector portion rear surface 363c is a surface of the rear side (+Z side) of the connector connection portion 363a. The connector portion rear surface 363c is a surface inclined with respect to a surface (XY plane) orthogonal to the axial direction (Z-axis direction). In this structure, the surface of the rear side of the connector connection portion 363a is comprised of only the connector portion rear surface 363c. The axial direction position of the connector portion rear surface 363c is directed to the front side (−Z side) in the radial outer direction. In other words, the radial distance between the connector portion rear surface 363c and the center axis J becomes gradually shorter in an upper side of the axial direction.

The position of the end of the radially inner side of the connector portion rear surface 363c is preferably identical or substantially identical in position to the seal portion 83 in the axial direction. The remaining portion other than the end of the radial inner side of the connector portion rear surface 363c is located at the front side ahead of the seal portion 83. That is, a portion of the surface of the rear side of the connector connection portion 363a is located at the front side ahead of the seal portion 83. The numerical value of the axial direction of the connector connection portion 363a is gradually reduced in the direction of the radial outer side.

As described above, the connector portion rear surface 363c is an inclined surface. Therefore, the air gap AR6 is defined in the rear side (+Z side) of the connector connection portion 363a. The air gap AR6 is disposed between the main body portion 62 and the connector main body portion 63b in the radial direction. Other constituent elements of the motor 310 are identical to those of the motor 10 shown in FIGS. 1 to 4, and as such a detailed description thereof will herein be omitted.

By the above-mentioned structures, deformation of the seal portion 83 may be significantly reduced or prevented by the same method as described above.

Figure 8:
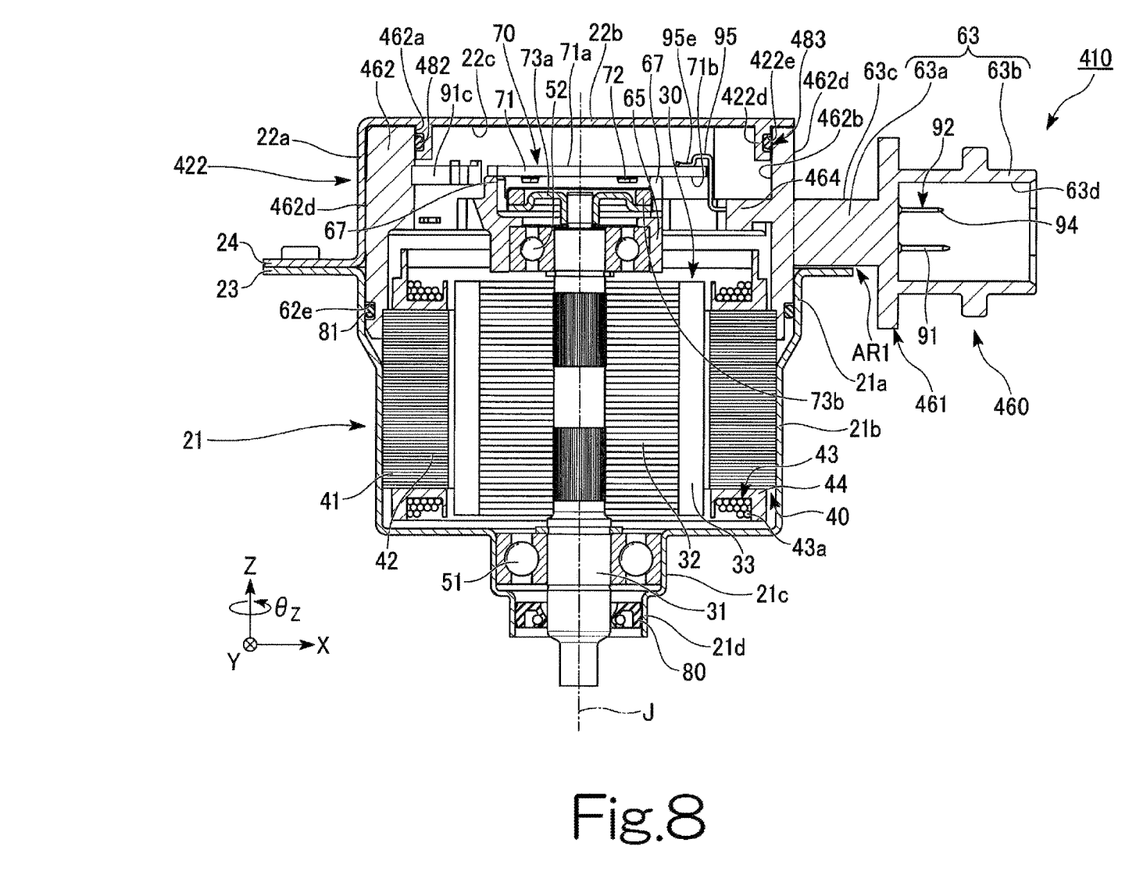
FIG. 8 is a cross-sectional view illustrating a motor according to a second preferred embodiment of the present invention.

A second preferred embodiment of the present invention in which the seal portion 483 is provided to the main body inner surface 462b of the main body portion 462 is different from the first preferred embodiments described above. In the following description, the same components as those of the above-mentioned preferred embodiments are denoted with the same reference numbers and therefore the description of thereof may be omitted.

FIG. 8 is a cross-sectional view illustrating a motor 410 according to a preferred embodiment of the present invention. As illustrated in FIG. 8, the motor 410 preferably includes a housing 21, a cover 422, a rotor 30 including a shaft 31, a stator 40, a first bearing 51, a second bearing 52, a controller 70, a bus bar assembly 460, and a plurality of O-rings. The plurality of O-rings preferably includes a front side O-ring 81 and a rear side O-ring 482.

The bus bar assembly 460 includes a bus bar holder 461. The bus bar holder 461 preferably includes a main body portion 462, a connector portion 63, and a connection terminal holding portion 464. The main body portion 462 includes an opening 462a and a main body inner surface 462d. The inner diameter of the main body portion 462 is preferably larger than that of the main body portion 62 shown in the first preferred embodiment. A seal portion 483 is disposed at the main body inner surface 462b of the main body portion 462. The rear side O-ring 482 is located at the seal portion 483.

The cover 422 preferably includes a cylindrical portion 22a, a cover portion 22b, an insertion portion 422d, and a cover flange portion 24. The cover portion 22b includes a cover front surface 22c. The insertion portion 422d protrudes from the cover front surface 22c toward the front side (−Z side). For example, in the plane view (XY plane view), the insertion portion 422d is formed in an annular shape. A groove portion 422e is provided along a circumference of the outer surface of the insertion portion 422d. The rear side O-ring 482 is inserted into the groove portion 422e. The insertion portion 422d is inserted in the direction from the opening 462a to the inner side of the main body portion 462.

The rear side O-ring 482 contacts the main body inner surface 462b over its circumference. Therefore, the insertion portion 422d indirectly contacts the seal portion 483 through the rear side O-ring 482. Other elements of the motor 410 are identical to those of the motor 10 shown in the first preferred embodiment, and as such a detailed description thereof will herein be omitted.

The motor of the above-mentioned second preferred embodiment is able to reduce or prevent reduction of sealability in the same manner as in the first preferred embodiment.

In addition, the insertion portion 422d is inserted into the main body portion 462, and indirectly contacts the seal portion 483 at the main body portion 462. Therefore, according to this preferred embodiment, the cover 422 is able to be more stably fixed to the main body portion 462.

Further, in the same manner as in the first preferred embodiment, the scope of the seal member at the seal portion 483 is not limited to the above-mentioned member. For example, a liquid gasket or the like may be used in the seal member. The scope of a member that seals a gap between the housing 21 and the bus bar holder 61 is not limited to the above-mentioned member, and a liquid gasket and the like may also be applied to the seal member. If the liquid gasket is used as the seal member at the seal portion 483, the insertion portion 422d of the cover 422 directly contacts the seal portion 483. That is, according to this preferred embodiment, the insertion portion 422d may directly or indirectly contact the seal portion 483.

While preferred embodiments of the present invention have been described above, it is to be understood that variations and modifications will be apparent to those skilled in the art without departing from the scope and spirit of the present invention. Specifically, features of the above-described preferred embodiments and the modifications thereof may be combined appropriately as long as no conflict arises. The scope of the present invention, therefore, is to be determined solely by the following claims.

What is claimed is:

1. A motor, comprising:
a rotor including a shaft which is centered on a center axis extending in one direction;
a stator enclosing the rotor and rotating the rotor about the center axis;
a first bearing located at a first side in the one direction of the stator and supporting the shaft;
a second bearing located at a second side of the stator opposite to the first side and supporting the shaft; and
a cylindrical housing holding the stator and the first bearing;
a bus bar assembly holding the second bearing, and allowing an end of the first side to be located in the housing;
a cover fixed to the housing to cover at least a portion of a second side of the bus bar assembly; and
a circuit board extending between the second bearing and the cover in the one direction, a surface of a second side of the circuit board extending to intersect the one direction; wherein
the bus bar assembly includes:
a bus bar electrically connected to the stator; and
a bus bar holder holding the bus bar; and
a wiring member that electronically connects an external power supply to the circuit board;
the bus bar holder includes:
a cylindrical main body portion including an opening at the second side; and
a connector portion protruding from the main body portion toward a radially outer side of the center axis, and located at the second side extending out from the housing;
the bus bar holder is provided with a seal portion directly or indirectly contacting the cover along a circumferential direction of the center axis;
the connector portion includes:
a connector connection portion connected to the main body portion; and
a connector main body portion disposed at a radially outer side extending out from the connector connection portion; and
at least a portion of a surface of a second side of the connector connection portion is located at the first side extending out from the seal portion at the radially outer side of the seal portion;
the wiring member includes a circuit board connection terminal electrically connected to the circuit board;
the circuit board connection terminal includes:
a first terminal portion protruding toward a radially inner side from the holding portion inner surface;
a second terminal portion extending from the end of the inner side of the radial direction of the first terminal portion toward the second side of the circuit board; and
a third terminal portion extending from the end of the second side of the second terminal portion toward the radially inner side;
a fourth terminal portion extending from the third terminal portion to the first side; and
a plate-shaped portion extending from the end of the first side of the fourth terminal portion toward the radially inner side; and
the second terminal portion is located in a radial gap between a radially outer side of the circuit board and a radially inner surface of the holding portion inner surface.

2. The motor according to claim 1, wherein
the seal portion is provided to the main body portion; and
an entire surface of the second side of the connector connection portion is exposed in a direction from the second side to the first side.

3. The motor according to claim 1, wherein the seal portion is provided at a surface of a second side of the main body portion.

4. The motor according to claim 1, wherein
the seal portion is provided at an inner surface of the main body portion; and
the cover includes an insertion portion that is inserted into the main body portion and directly or indirectly contacts the seal portion.

5. The motor according to claim 1, wherein an entire surface of the second side of the connector connection portion is located at the first side extending out from the seal portion.

6. The motor according to claim 1, wherein the surface of the second side of the connector connection portion includes a concave portion which is concaved toward the first side.

7. The motor according to claim 1, wherein:
the bus bar holder contacts an end of a second side of the stator; and
a gap is provided between the connector portion and the housing in the one direction.

8. The motor according to claim 1, wherein:
the cover includes a cover flange portion at an end of the first side;
the housing includes a housing flange portion at an end of the second side; and
the cover flange portion is fixed to the housing flange portion.

9. The motor according to claim 1, wherein
the bus bar includes a coil connection portion that protrudes from an inner surface of the main body portion and is electrically connected to a coil of the stator.

10. The motor according to claim 9, wherein
an end of a second side of the coil connection portion is located at the second side extending out from the first side of the circuit board.

11. The motor according to claim 9, wherein at least a portion of the coil connection portion overlaps with the circuit board in a radial direction.

12. The motor according to claim 9, wherein the circuit board connection terminal and the coil connection portion are located at different positions in a circumferential direction of the center axis.

13. The motor according to claim 1, wherein
the plate-shaped portion includes a connection surface parallel or substantially parallel to a surface of the second side of the circuit board; and
the connection surface contacts the surface of the second side of the circuit board.

* * * * *